T. SLOPER.
METHOD OF MANUFACTURING STRAIN INSULATORS.
APPLICATION FILED MAR. 31, 1915.

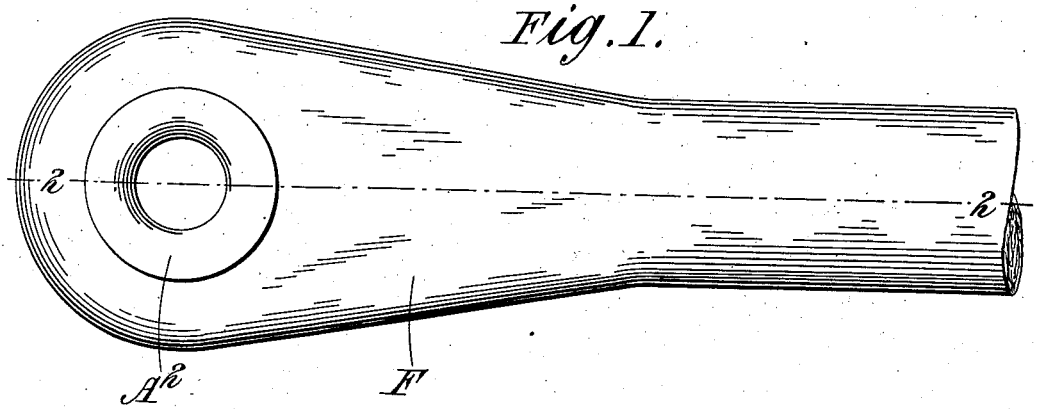
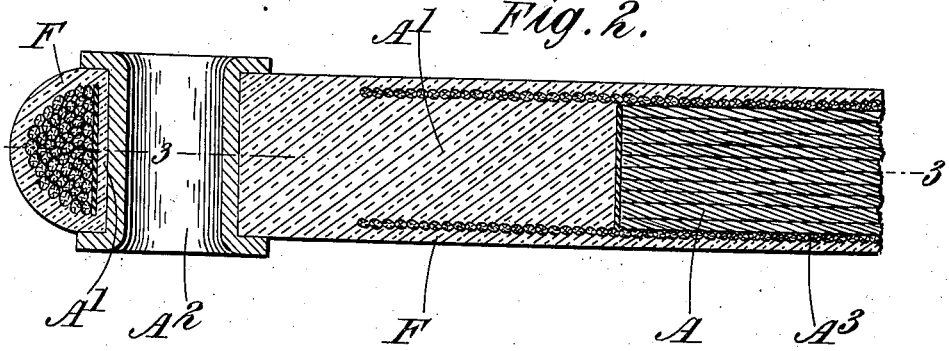
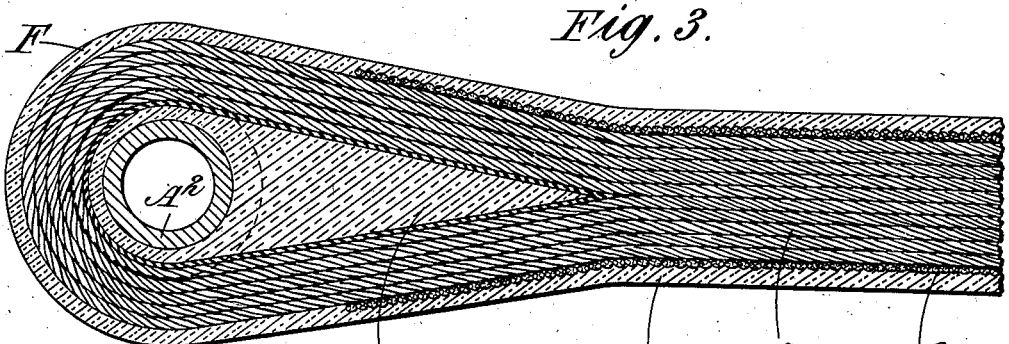

1,167,125.

Patented Jan. 4, 1916.
4 SHEETS—SHEET 2.

T. SLOPER.
METHOD OF MANUFACTURING STRAIN INSULATORS.
APPLICATION FILED MAR. 31, 1915.

1,167,125.

Patented Jan. 4, 1916.

Witnesses:

Inventor:
Thomas Sloper

T. SLOPER.
METHOD OF MANUFACTURING STRAIN INSULATORS.
APPLICATION FILED MAR. 31, 1915.

1,167,125.

Patented Jan. 4, 1916.
4 SHEETS—SHEET 4.

Witnesses:
Jesse B. Heller
J. H. McCorvin

Inventor:
Thomas Sloper.
by Bakewell, Byrnes & Parmelee
Attys.

UNITED STATES PATENT OFFICE.

THOMAS SLOPER, OF DEVIZES, ENGLAND.

METHOD OF MANUFACTURING STRAIN-INSULATORS.

1,167,125.

Specification of Letters Patent.

Patented Jan. 4, 1916.

Application filed March 31, 1915. Serial No. 18,324.

*To all whom it may concern:*

Be it known that I, THOMAS SLOPER, a subject of the King of England, residing at Devizes, in Wiltshire, England, have invented certain new and useful Improvements in Methods of Manufacturing Strain-Insulators, of which the following is a specification.

This invention is for improvements in or relating to the manufacture of strain insulators.

These insulators as used for aerials have heretofore been built up by winding rubbered thread (usually in the form of cord) on a "former" in the form of an elongated loop, the threads being pressed together by hand so that they adhered one to another, removing the loop thus built up from the "former", and collapsing the sides together without closing the ends so that eyes were formed at the ends to receive thimbles or other fastening means. The insulator thus built up was then lashed at its ends and finally coated with rubber and vulcanized. It has been found that in making up such insulators, the threads although laid parallel to each other when winding them on the "former", often got displaced during the further steps in the manufacture, so that the resulting insulator was weakened in that all the threads did not take their proper proportion of the strain.

One object of the present invention is to provide an insulator built up as described above but by a process which insures that each thread shall take its proper proportion of the load.

Another object of the invention is to provide such an insulator which cannot bend unduly, as undue bending results in cracking the varnish with which they are finally coated for the purpose of increasing their insulating properties.

A press tool is used in carrying out the process, which tool however is not claimed herein but forms the subject of a separate application.

Figure 9:
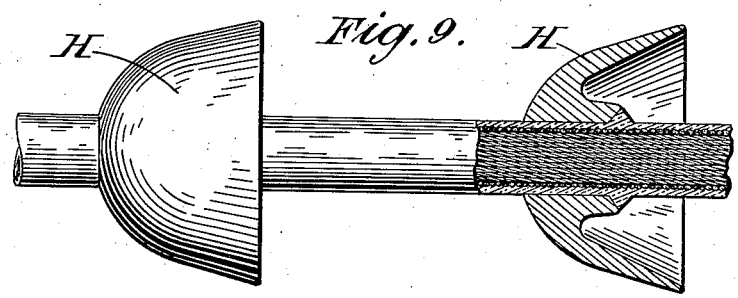
Figure 4:
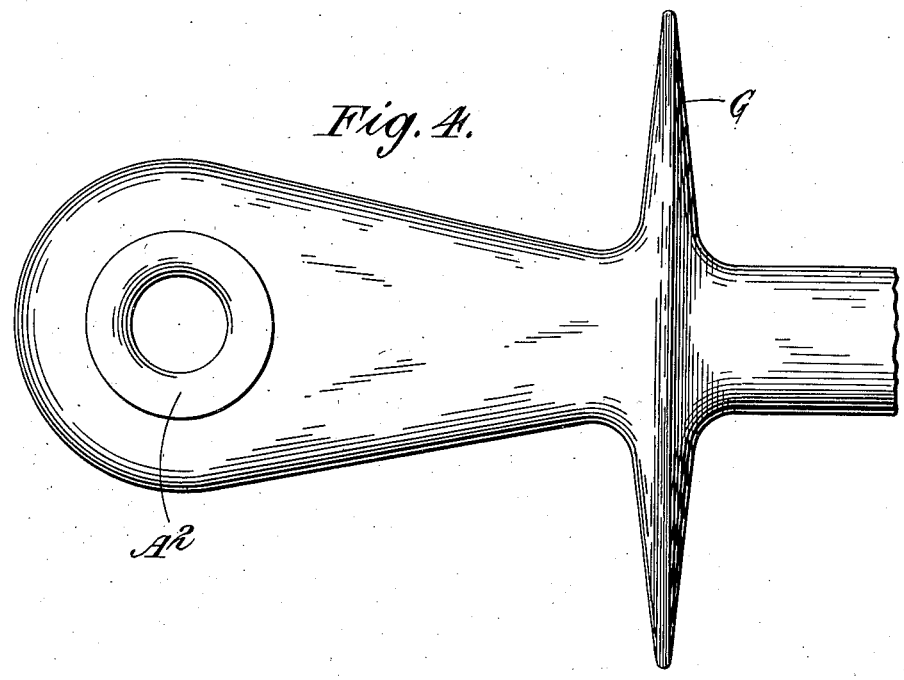
Figure 10:
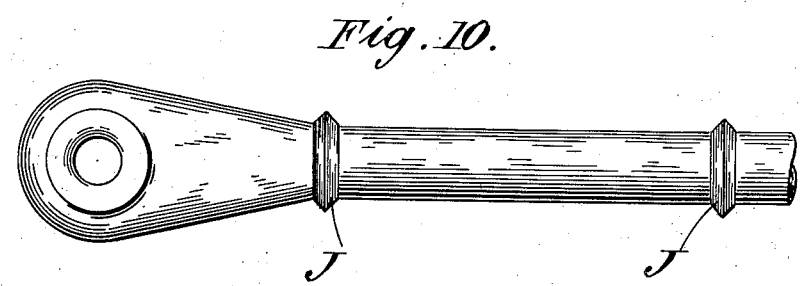
Figure 5:
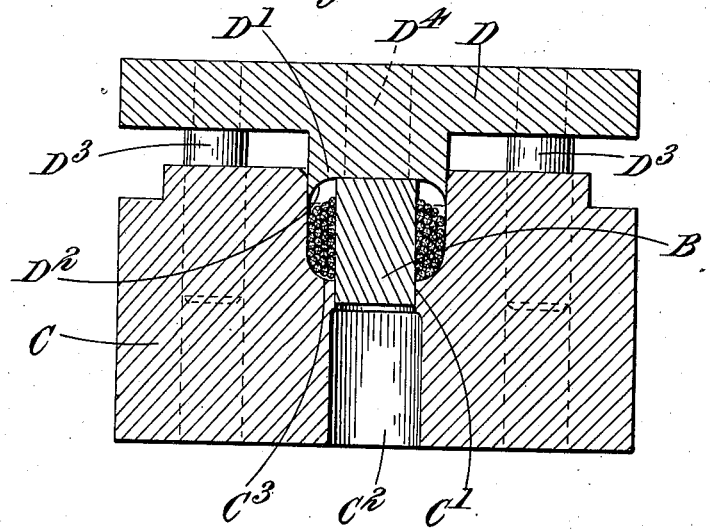
Figure 7:
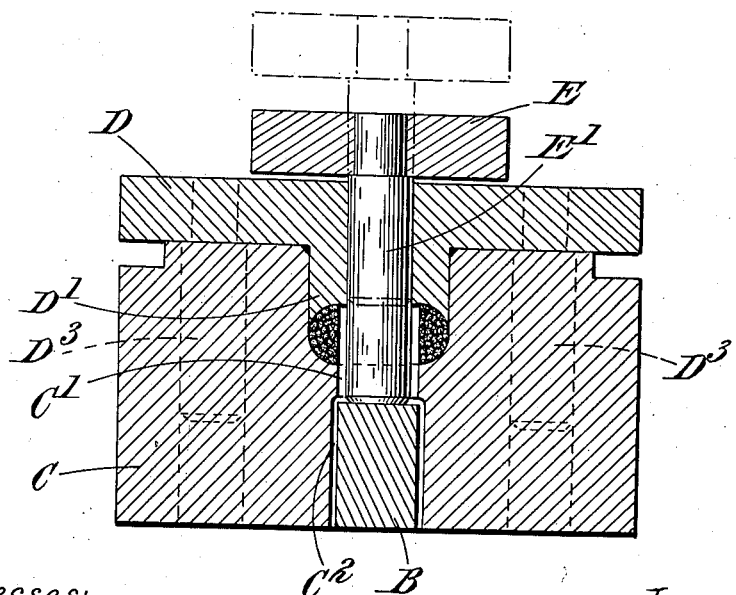
Figure 6:
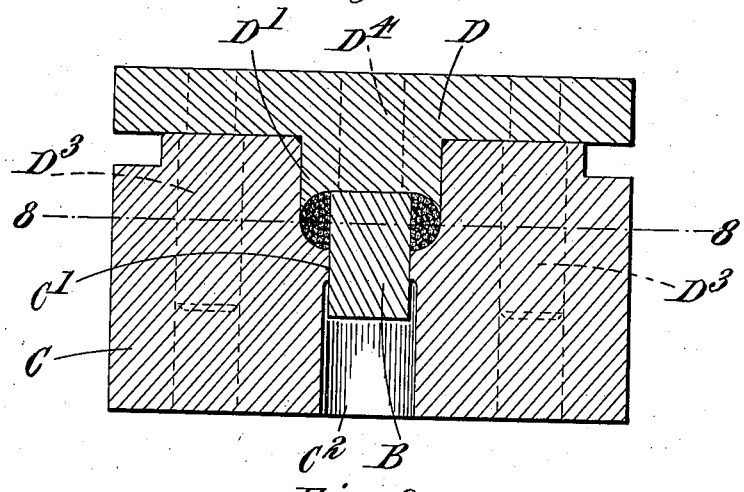
Figure 8:
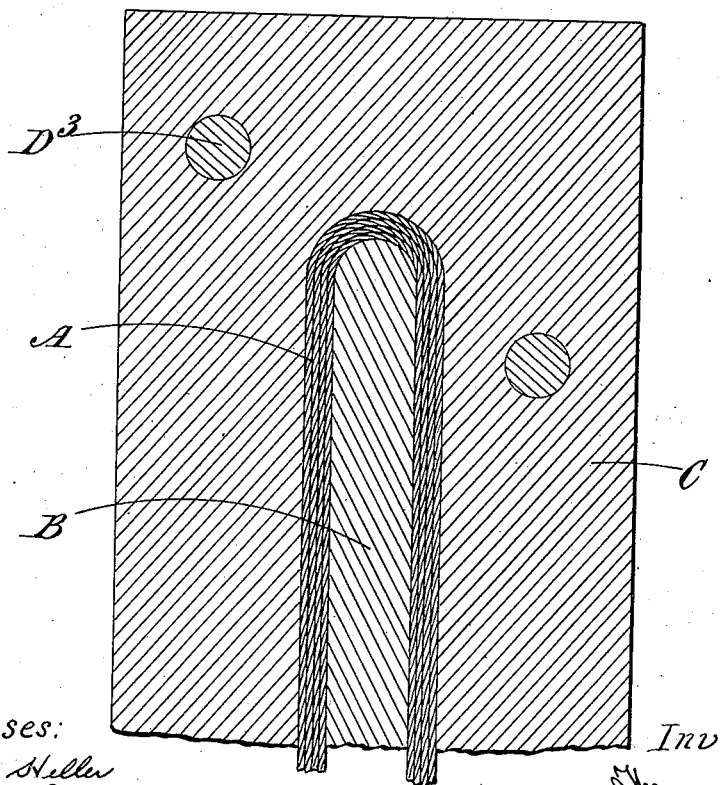

In the accompanying drawings:—Figure 1 is a face-view of one end of an insulator constructed according to one method of carrying out this invention; Fig. 2 is a section through the same on the line 2—2 of Fig. 1; Fig. 3 is another section through the same insulator on the line 3—3 of Fig. 2; Fig. 4 is a face-view of a modified form of insulator constructed according to this invention; Fig. 5 is a transverse section through a press-tool constructed according to this invention for carrying out the process of manufacture of the insulators; Fig. 6 shows the same section as Fig. 5 but with the parts in a different position; Fig. 7 shows a section similar to Fig. 5 but in a different plane with the parts in yet another position and a further element added, Fig. 8 is a section on the line 8—8 of Fig. 6. Fig 9 shows in part section yet another form of insulator according to this invention, and Fig. 10 shows a still further form of insulator according to this invention.

The same letters indicate the same parts throughout the drawings.

In building up the insulators, rubbered threads A, such as are well-known from their use in the manufacture of Palmer cord tires, are first wound upon a "former" B, Figs. 5–8, which "former" in shape resembles a rectangular bar having rounded ends, and the thread is so wound upon it as to constitute when removed from the "former" an elongated loop, as can be seen by reference to Figs. 5–8.

The threads are laid parallel to each other and in laying them as even a tension as possible is maintained throughout. The rubbered thread, as is known, is tacky, so that when laid together they will adhere to some extent to one another, but it has been found that pressing them together by hand does not cause them to adhere to one another sufficiently to prevent derangement during their removal from the "former" or during their subsequent treatment. To cause them to adhere firmly to one another, the press-tool shown in Figs. 5–8 is therefore employed. This tool comprises a base-die C and a coöperating die D. The base-die is provided with a through slot which at $C^1$ is made to fit the "former" B but below this the slot is enlarged as shown at $C^2$. The upper face of the die C is recessed about the slot at $C^3$, the bottom part of this recess being made of such size and shape as to correspond to the size and shape the lower half of the loop of thread A is required to take when compressed by the dies while still on the "former".

The upper die D has a tongue $D^1$ which enters the recess $C^3$ and has its lower face $D^2$ shaped to correspond to the size and form the upper half of the loop of thread A is required to take.

The die D is conveniently guided in the die C by pins D³ and may be connected to the movable member of a press, or it may be operated merely by striking it.

The thread A is conveniently wound on the middle portion of the "former" B so that the "former" projects both above and below the loop as shown in Fig. 5. It follows therefore that as the die D is forced home, it first drives the "former" B partially through the loop and then compresses the thread so that the parts finally take the position shown in Fig. 6.

The die D is provided with two or more perforations D⁴ which extend from its upper face through the tongue D¹ so that a driver comprising a plate E and having two or more pins E¹ which register with and slide through the perforations D⁴ can be employed to discharge the "former" B from the loop.

It will be appreciated that if the "former" and loop were taken out of the dies and then the loop removed by pulling it from the "former", the threads might get displaced, whereas if the "former" is thrust out of the loop by forcing the driver E downward until the pins E¹ drive the "former" right through the loop into the enlargement C² of the through-way slot in the die C, the threads are held meanwhile by the dies so that they cannot be displaced relatively to one another.

In Fig. 7, the driver is shown as having been advanced and the "former" B is shown lying in the enlargement C² of the slot in the die C. This enlargement is conveniently made of sufficient depth to accommodate the "former" so that the dies may stand upon a flat surface if desired, while the "former" is being thrust out, and the "former" will then be found quite loose in the bottom of the die C. The driver E is conveniently operated in the same press as is employed for consolidating the core. The loop of thread A is now removed from the dies and the two faces which rested on the sides of the "former" are collapsed together except at the ends of the loop. These faces are flat so that the two limbs of the loop can be made to unite as one. In Fig. 3, the threads A are shown thus brought together and the space which occurs at each end of the limb is afterward filled with rubber A¹. The rubber is not only made to fill the space, but also to surround a metal or other thimble A² which is inserted in the eye to constitute the permanent eye whereby the insulator may be connected to shackles or other fastening means between it and the aerial stays with which it is intended to be used. The thread A, after introducing the rubber A¹ at the ends of the insulator, is lashed with a binding-thread A³ throughout the whole of its length except the extreme ends where the thimbles A² are provided. This wrapping of the thread stiffens the insulator so that it cannot easily be bent unduly. The whole of the insulator is finally covered with a coating of rubber F and then vulcanized, which makes all the parts adhere firmly together including the thimble A² which thereby becomes firmly connected to the rubber-filling A¹ and the exterior coating of rubber F.

The insulator is sometimes finally varnished to increase its insulating properties and the lashing of thread A³, which as before stated prevents undue bending of the insulator, thus acts to prevent cracking of the varnish by any such undue bending.

The exterior of the insulator may be variously formed according to requirements, for example, water-sheds G, Fig. 4, may be built up thereon. The water-shed shown in Fig. 4 is in the form of a flange of rubber or other material covered with rubber built up upon the insulator, and serves the purpose of throwing off drops of water which run down the insulator.

Fig. 9 shows an inverted cup-shaped water-shed H which may be built up on the insulator, and Fig. 10 shows a small ring-shaped water-shed J. It will be appreciated that these water-sheds may take various forms according to requirements.

What I claim as my invention and desire to secure by Letters Patent is:—

1. In a process of manufacture of insulators for strainers from rubbered thread, the following steps, (a) winding the thread on a "former" to constitute an elongated loop, (b) placing the loop while still on the "former" between the movable dies of a press-tool shaped to the form it is desired the exterior of the loop shall take while still on the "former," (c) compressing the loop between the said dies, and (d) removing the loop from the "former."

2. In a process of manufacture of insulators for strainers from rubbered thread, the following steps, (a) winding the thread on a "former" to constitute an elongated loop, (b) placing the loop while still on the "former" between the movable dies of a press-tool shaped to the form it is desired the exterior of the loop shall take while still on the "former", (c) compressing the loop between the said dies, and (d) removing the loop from the "former" by driving the "former" out of the loop while the latter itself still remains between the dies of the press-tool.

3. In a process of manufacture of insulators for strainers from rubbered thread, the following steps, (a) winding the thread on a "former" to constitute an elongated loop, (b) placing the loop while still on the "former" between the movable dies of a press-tool shaped to the form it is desired the exterior of the loop shall take while still on the "former", (c) compressing the loop between the said dies, (d) removing the loop from the "former", (e) collapsing the limbs of the loop together except at the ends which are left open to form eyes, and (f) lashing the collapsed part of the loop around with thread from eye to eye.

4. In a process of manufacture of insulators for strainers from rubbered thread, the following steps, (a) winding the thread on a "former" to constitute an elongated loop, (b) placing the loop while still on the "former" between the movable dies of a press-tool shaped to the form it is desired the exterior of the loop shall take while still on the "former", (c) compressing the loop between the said dies, (d) removing the loop from the "former", (e) collapsing the limbs of the loop together except at the ends which are left open to form eyes, (f) inserting a thimble of hard material with a surrounding filling-piece in each eye, (g) lashing the collapsed part of the loop around with thread from eye to eye, and (h) vulcanizing the whole of these parts together.

5. In a process of manufacture of insulators for strainers from rubbered thread, the following steps, (a) winding the thread on a "former" to constitute an elongated loop, (b) placing the loop while still on the "former" between the movable dies of a press-tool shaped to the form it is desired the exterior of the loop shall take while still on the "former", (c) compressing the loop between the said dies, (d) removing the loop from the "former", (e) collapsing the limbs of the loop together except at the ends which are left open to form eyes, (f) forming a laterally projecting water-shed on the strainer at a point between the eyes, and (g) vulcanizing the water-shed on to the strainer when the whole is vulcanized.

In testimony whereof I have signed my name to this specification in the presence of two subscribing witnesses.

THOMAS SLOPER.

Witnesses:
    HAROLD PARSONS.
    W. L. AVERIE.